A. PAUL.
HAND CORN AND BEAN PLANTER.
APPLICATION FILED SEPT. 21, 1918.
1,295,057. Patented Feb. 18, 1919.
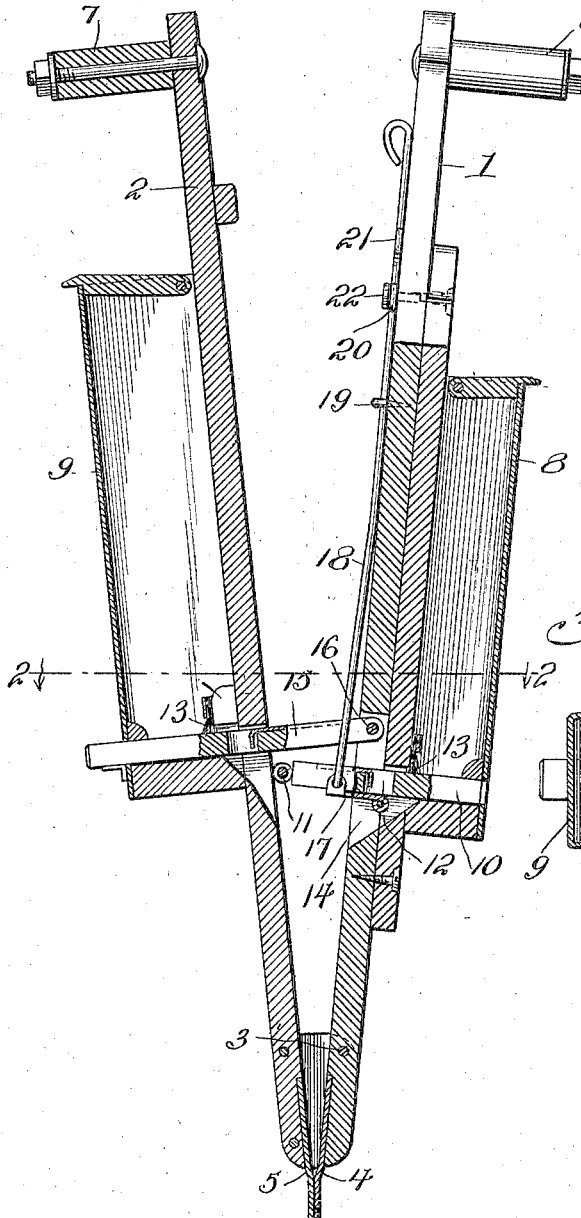
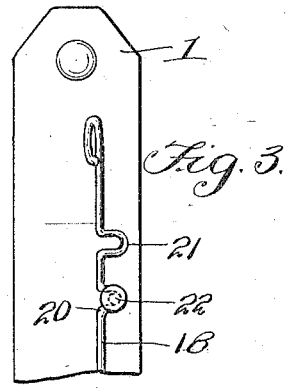
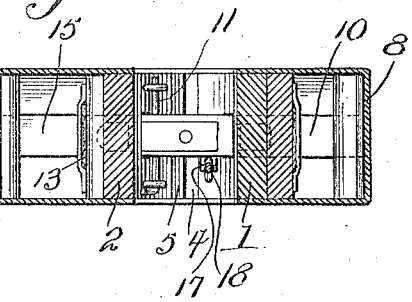
Inventor
Andrew Paul
By Victor J. Evans
Attorney

UNITED STATES PATENT OFFICE.

ANDREW PAUL, OF WATERTOWN, TENNESSEE.

HAND CORN AND BEAN PLANTER.

1,295,057.

Specification of Letters Patent.

Patented Feb. 18, 1919.

Application filed September 21, 1918. Serial No. 255,110.

*To all whom it may concern:*

Be it known that I, ANDREW PAUL, a citizen of the United States, residing at Watertown, in the county of Wilson and State of Tennessee, have invented new and useful Improvements in Hand Corn and Bean Planters, of which the following is a specification.

This invention is an improved hand planter especially adapted for use for simultaneously planting two kinds of seed such as corn and beans, the object of the invention being to provide an improved hand planter of this kind which is simple in construction, which can be readily operated, and which embodies a cut-off by means of which one of the seed dropping mechanisms may be rendered operative when desired, so that only one kind of seed can be planted.

With the above and other objects in view, the invention consists in the construction, combination and arrangement of devices hereinafter described and claimed.

In the drawings:

Figure 1 is a vertical sectional view of a hand planter constructed and arranged in accordance with my invention.

Fig. 2 is a sectional view of the same taken on the plane indicated by the line 2—2 of Fig. 1.

Fig. 3 is a detail elevation of the cutoff valve operating rod and its stop.

My improved hand planter comprises a pair of members 1, 2 the lower portions of which form opposite sides of a seed spout. The said members are pivotally connected together at their lower ends as at 3 and are also provided at their lower ends with shoes or jaws 4, 5, respectively, which open and close as the members 1, 2 move angularly toward and from each other. The said members are, respectively, provided at their upper ends with outwardly extending handles 6, 7 and are also, respectively, provided on their outer sides with hoppers or seed containers 8, 9, one for one kind of seed, say, for instance, corn, and the other for another kind of seed, say, for instance, beans. A seed dropping slide 10 operates in the bottom of the hopper 8 and is pivotally connected as at 11 to the member 2. Said slide has the usual seed opening 12 and said hopper 8 has the usual brush 13 to operate on the slide. A passage 14 is formed in the member 1 and bottom hopper 8 through which the seeds can drop into the space between the members 1, 2 and, hence, into the hill, when the members 1, 2 are moved outwardly and the opening 12 of the slide 10 is caused to register with said passage 14 and as will be understood.

A seed slide 15 which is identical in construction with the slide 10 is arranged to operate in the bottom of the hopper 2 and is pivotally connected as at 16 to the member 1. Hence, both of the seed slides operate simultaneously when the members 1, 2 are moved toward or from each other and, hence, seeds are simultaneously dropped from both of the hoppers and into the same hills.

When it is desired to plant corn and to omit the planting of beans in certain of the hills, or in all of the hills, as the case may be, the operator closes a cut-off valve 17 which is pivotally mounted in the passage 14 and is arranged below the slide 10. The said cut-off valve is pivotally connected to the lower end of an operating rod 18, which, in practice, is a wire of suitable gage. Said rod operates in a guide 19 and is provided with a pair of offsets 20, 21, which form notches, either of which may be engaged by a stop 22. When the cut-off valve is in lowered position, the notch 21 is engaged with the stop 22 so that said cut-off valve is held in such position. When the valve is closed, the notch 20 registers and should be engaged with the stop 22 to hold the cut-off valve in such closed position.

While I have herein shown and described a preferred embodiment of my invention, I would have it understood that changes may be made in the form, proportion and construction of the several parts without departing from the spirit of my invention and within the scope of the appended claim.

Having thus described my invention, I claim:

A hand corn planter of the class described, comprising a pair of members pivotally connected together and each provided on its outer side with a hopper, seed dropping slides for the respective hoppers and each pivotally connected to one of said members, a cut-off valve carried by one of said members and arranged to close against the lower side of the seed dropping slide of said member, a rod connected to said cut-off valve to operate the same and means to hold said rod in either valve opening or valve closing position.

In testimony whereof I affix my signature.

ANDREW PAUL.